(12) United States Patent
Masri

(10) Patent No.: US 6,592,159 B1
(45) Date of Patent: Jul. 15, 2003

(54) SCOOPING DEVICE FOR FLOWABLE MATERIAL

(76) Inventor: Samir Masri, 14081 Wynn St., West Minster, CA (US) 92683

( * ) Notice: Subject to any disclaimer, the term of this patent is extended or adjusted under 35 U.S.C. 154(b) by 0 days.

(21) Appl. No.: 10/081,958

(22) Filed: Feb. 25, 2002

(51) Int. Cl.$^7$ ............................................. B65B 1/04
(52) U.S. Cl. ........................ 294/55; 141/334; 222/460
(58) Field of Search ........................... 294/1.3, 49, 55; 15/257.3; 30/141, 324; 73/426, 429; 141/98, 108, 331, 334, 390, 391; 222/460, 462; 446/70; D7/654, 691, 692

(56) References Cited

U.S. PATENT DOCUMENTS

| | | | | |
|---|---|---|---|---|
| 220,576 A | * | 10/1879 | Chilis | 294/55 X |
| 952,313 A | * | 3/1910 | Droz | 141/334 X |
| 1,857,712 A | * | 5/1932 | De Martini | 30/141 |
| 2,116,979 A | * | 5/1938 | Moller | 141/334 X |
| 2,739,464 A | * | 3/1956 | Smith | 141/334 |
| 3,354,575 A | * | 11/1967 | Darrow | 294/55 X |
| 3,835,580 A | * | 9/1974 | Keces | 446/70 |
| 4,627,128 A | * | 12/1986 | Shea | 294/55 X |
| D337,244 S | * | 7/1993 | Kilham | 294/55 X |
| 5,845,685 A | * | 12/1998 | Cooper | 294/55 X |

FOREIGN PATENT DOCUMENTS

| | | | | |
|---|---|---|---|---|
| GB | 612851 | * | 11/1948 | 294/55 |

* cited by examiner

Primary Examiner—Dean J. Kramer
Assistant Examiner—Paul T. Chin
(74) Attorney, Agent, or Firm—Erik M. Arnhem

(57) ABSTRACT

A flowable material can be transferred from a contained mass of material to a remote container, by using a manual scooping implement that includes an elongated hollow tube having a funnel configuration. One end of the tube is closed, while the other end is open to form an exit opening. An entrance opening in the tube side wall near the closed end of the tube enables the tube to be inserted downwardly into a mass of flowable material to capture some of the material within the tube. The tube can be inverted for pouring the captured material into a container.

4 Claims, 3 Drawing Sheets

SCOOPING DEVICE FOR FLOWABLE MATERIAL

FIELD OF THE INVENTION

This invention relates to a manual implement for scooping flowable material from a pile or container, and pouring the scooped material into another container. The scooping implement can be used with various granular materials or liquid materials, e.g. cracked ice, cereal grains, sugar, flour, water, motor oil, powdered milk or pet food.

BACKGROUND AND SUMMARY OF THE INVENTION

During cooking and baking operations a person commonly transfers liquid or granular materials from individual containers to mixing bowl, where the materials are mixed together to form a dough or sauce. Typically measuring spoons or measuring cups are used for such transfer operations. "An implement, according to the present invention, facilitates the scooping up of material from narrower or deeper containers into other containers. Conversely in filling small containers with material from big bags, e.g. of rice or sugar, an implement of the present invention can be employed to avoid having to lift the heavy bags to complete the operation."

When the person's hands are afflicted with arthritis or some other infirmity the hand can sometimes shake or quiver, resulting in spillage of material from the spoon or cup.

The present invention relates to a scooping implement that can be used for transferring flowable material from one container to another container, with a reduced danger of spillage out of the scooping implement during the transfer operation.

In preferred practice of the invention the scooping element takes the form of an elongated hollow tube having one closed end and one open end. An entrance opening is formed in the tube side wall proximate to the closed end of the tube. The scooping element could also take the form of a square container.

In use of the scooping element, the hollow tube is pushed downwardly into a contained mass of flowable material, whereby some material flows into the tube through the entrance opening. The quantity of material admitted into the tube is related to the insertional depth of the tube into the contained mass of flowable material, i.e. as the tube is inserted further into the material, more material, is admitted into the tube. The size of the entrance opening varies with the quantity of material to be admitted for a specific purpose. Gradation markings can be provided on the tube outer surface to coincide with varying surface levels of material captured by the tube. For example, such gradation markings can provide measurements of a spoon or cup size or more of material.

The tube is lifted out of the contained mass of flowable material and then inverted so that the open end of the tube is presented to a target container. The inverting operation causes the captured material to flow out of the tube through the tube open end into the target container.

In preferred practice of the invention the hollow tube has a frusto-conical configuration, with the closed end of the tube having a cross-sectional area that is appreciably greater than the cross-sectional area of the tube open end. Typically, the closed end of the tube has about seven times the cross sectional area of the tube open end, so that the tube has a funnel configuration. A relatively large quantity of flowable material can be captured in the large end of the tube and subsequently discharged out of the tube through the small open end of the tube. The discharged material is in the form of a narrow stream that can be accurately directed into a target container, with minimal chance for spillage.

The scooping implement of the present invention can be used with various flowable materials, e.g. bird feed, sugar, flour, sand, cement, water, soup, motor oil or cracked ice. The size of the scooping implement is related to the material being scooped and the intended function of the implement.

Further features and advantages of the invention will be apparent from the attached drawings and description of an illustrative embodiment of the invention.

DESCRIPTION OF A PREFERRED EMBODIMENT OF THE INVENTION

Figure 1:
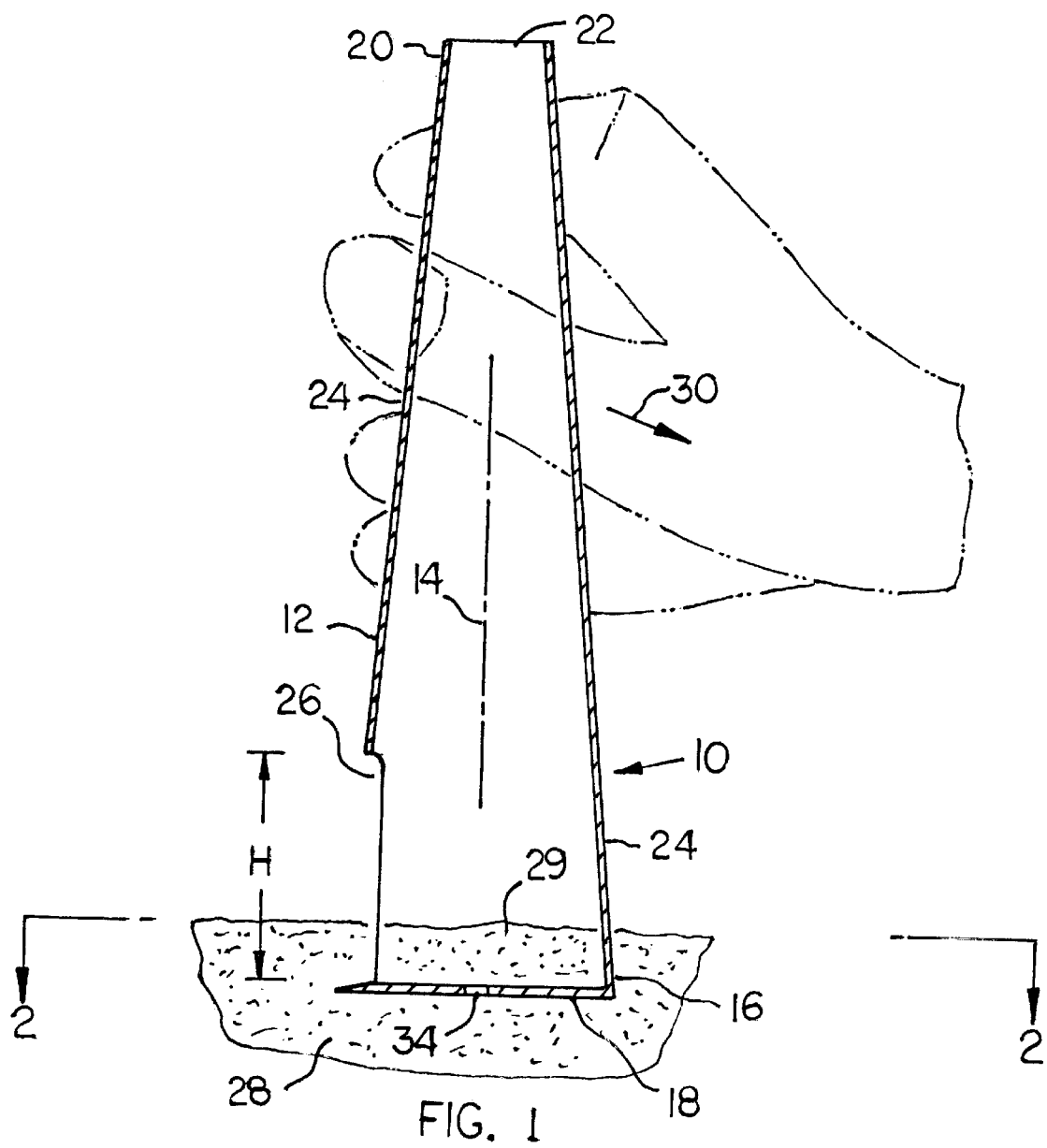
FIG. 1 is a sectional view taken through a scooping implement constructed according to the invention. A user's hand is shown in dashed lines to illustrate the manner in which the implement is inserted into a mass of flowable material.
Figure 2:
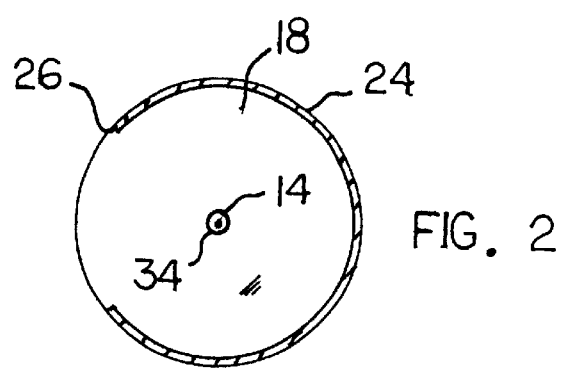
FIG. 2 is a transverse sectional view taken on line 2—2 in FIG. 1.

Referring to FIGS. 1 and 2, there is shown scooping implement (or device) 10 embodying the invention. The scooping device includes a hollow tube 12 having a frusto-conical configuration. In FIG. 1 the central longitudinal axis of the tube is referenced by numeral 14.

First end 16 of the tube is closed by a flat end wall 18 extending transversely across the tube longitudinal axis 14. As shown in FIG. 2, end wall 18 has a circular configuration conforming to the circular cross section of the hollow tube.

Figure 4:
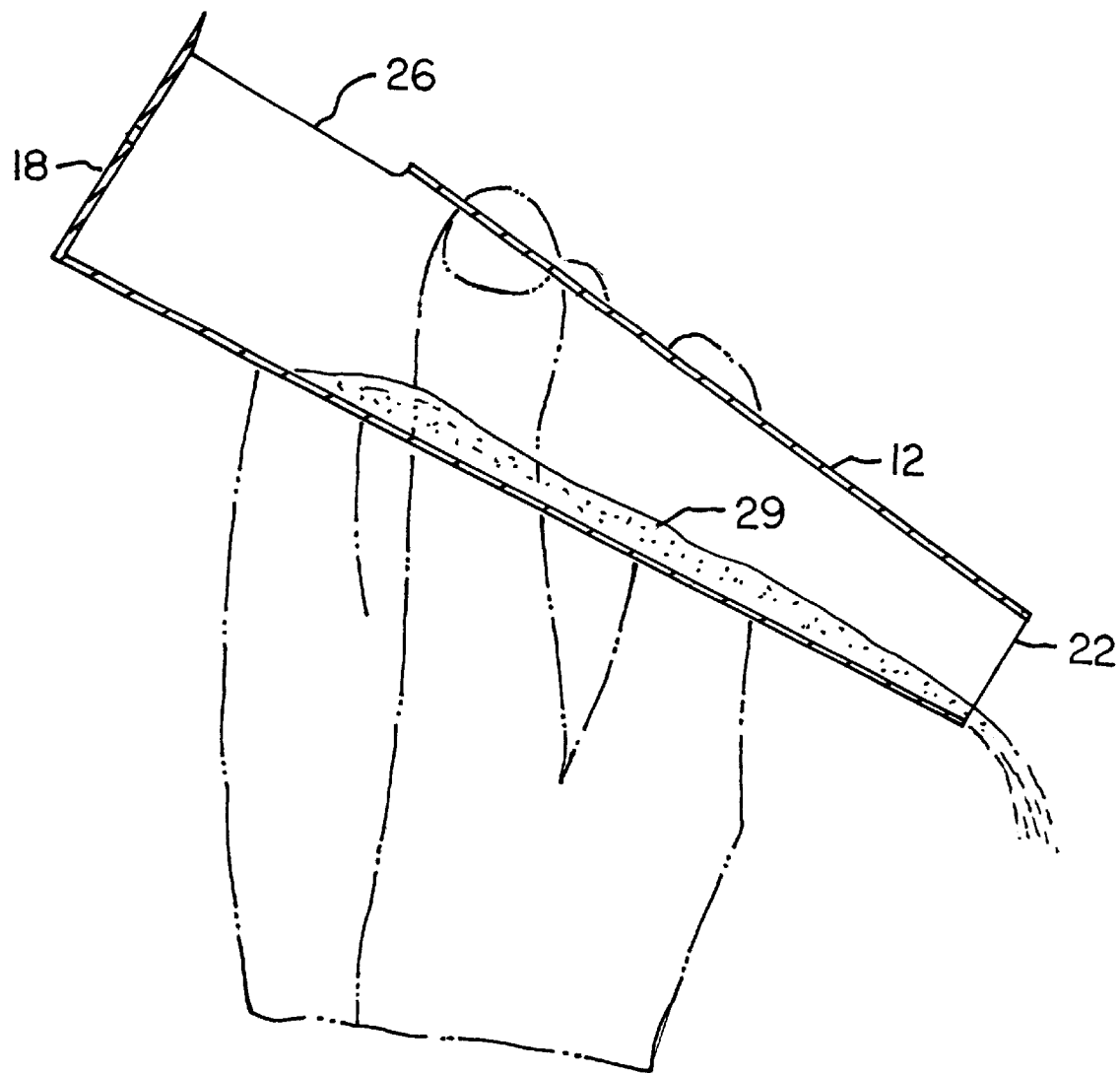
FIG. 4 shows the FIG. 1 scooping implement in a partially inverted position, suitable for pouring flowable material out of the scooping implement into a container (not shown).

Second end 20 of the tube is open to form an exit opening 22 for flowable material located within the tube. When the tube is inverted, as shown in FIG. 4, material can flow out of the tube through exit opening 22.

Referring back to FIGS. 1 and 2, the tube side wall 24 is provided with an entrance opening 26 proximate to end wall 18. As shown in FIG. 2, the entrance opening has a circumferential dimension that measures approximately ninety degrees around central axis 14.

The frusto-conical tube is tapered from tube end 16 to tube end 20, so that exit opening 22 has a cross sectional area that is appreciably less than the cross sectional area of end wall 18. Typically, the area of end wall 1 8 is about seven times the area of exit opening 22, so that the tube can act as a funnel to concentrate the stream of flowable material when the tube is in the inverted condition depicted in FIG. 4.

The size of the hollow tube can vary, depending on the flowable material and purpose for the scooping device. In some cases the scooping device may be required to handle a relatively small quantity of flowable material. In other cases the material requirement may be relatively greater. The length and diameter of the hollow tube 12 will vary accordingly. In any case the tube length will be at least two inches, so that the tube can serve as its own handle when the tube is being manipulated. A five inch tube length is sufficient to permit the user to have his hand encircle the tube for controlling the tube position without obstructing the entrance opening 26.

The scooping device is manually operated or controlled so that end 16 of tube 12 is inserted downwardly into a contained mass of flowable material, referenced by numeral 28. FIG. 1 shows tube 12 inserted into flowable material 28, such that a quantity of material 29 flows into the tube through entrance opening 26. It may be necessary, or desirable, to slide the tube in a right-to-left direction in order to achieve the condition depicted in FIG. 1. The exposed edge of end wall 18 can be sharpened to facilitate movement of the tube in a right-to-left direction.

Figure 3:
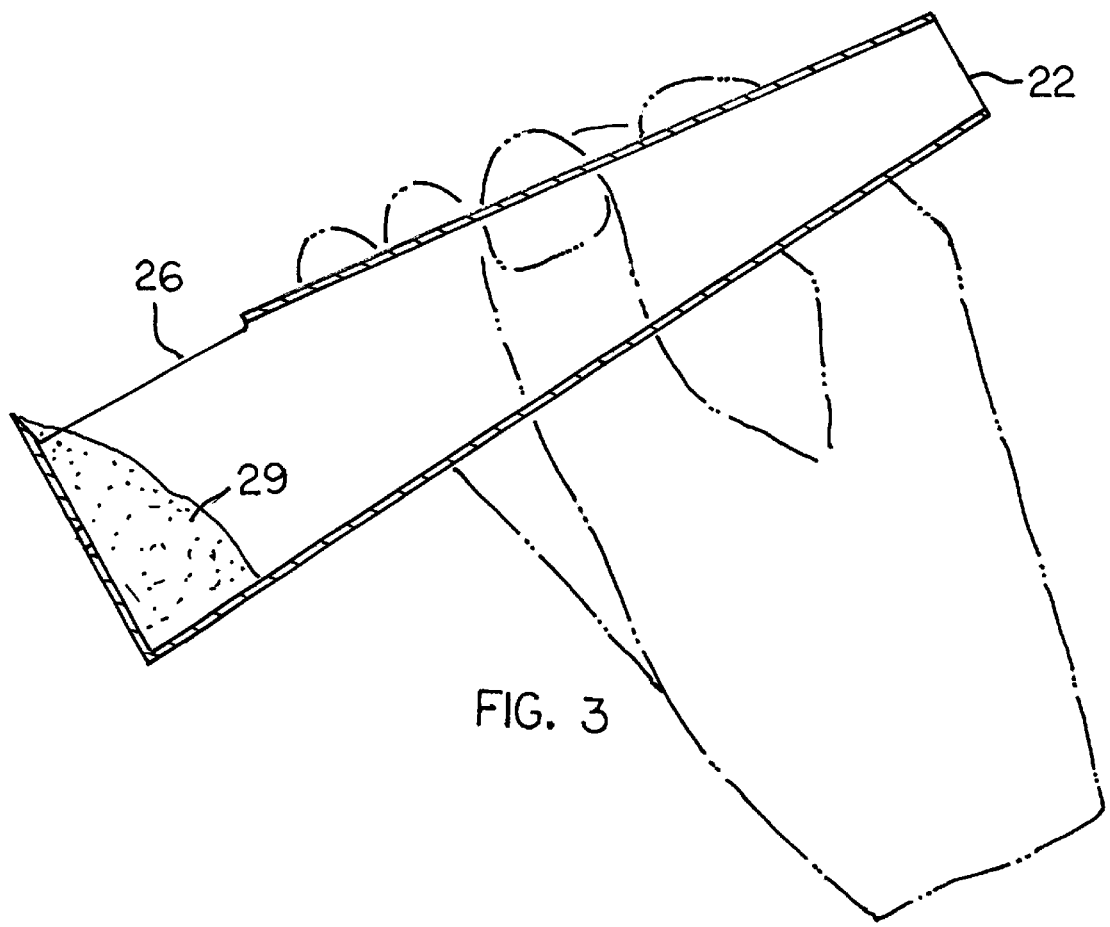
FIG. 3 is a view taken in the same direction as FIG. 1, but showing the scooping implement lifted out of the mass of flowable material.
Figure 5:
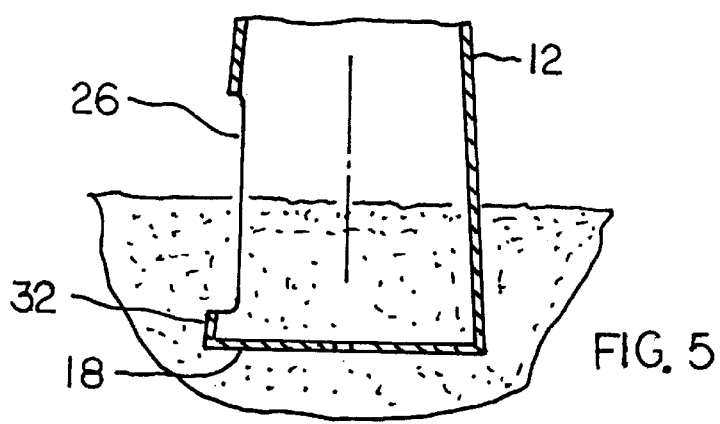
FIG. 5 is a fragmentary sectional view taken in the same direction as FIG. 1, but showing another scooping element embodying the invention.

When the FIG. 1 condition is achieved, the tube is tilted slightly to the right, as denoted by arrow 30, whereby the captured material 29 is retained within the tube. The tube is then lifted upwardly to the elevated position depicted in FIG. 3.

FIG. 4 shows tube 12 in the pouring position, wherein the fowable material is gravitationally discharged out of the tube through exit opening 22, into a non-illustrated container. The funnel-like nature of tube 12 concentrates the discharge stream, so that there is minimal chance for spillage or mis-direction of the material.

As previously noted, tube 12 acts as a handle for the scooping implement. The diameter of the tube is usually large enough that a person having a small hand, or a hand afflicted with arthritis, can curl his fingers sufficiently to achieve a good grasp of the tube. The person can have good control of the scooping implement while it is being manipulated through the various operations depicted in FIGS. 1, 3 and 4. The control is better than the control achieved with conventional spoons or measuring cups, where the handle is usually thin and not so easily grasped; such conventional means need more space, than the scooping device, to scoop up material effectively.

One advantage of the illustrated scooping implement is that tube 12 is readily controllable, so that the captured material 29 is precluded from spilling out of the scooping element while tube 12 is being manipulated. Another advantage of the scooping implement is that relatively large quantities of flowable material can be extracted from the contained mass of material 28.

FIG. 1 shows tube 12 partially inserted into flowable material 28 so that only a portion of the entrance opening 26 is used for admitting material into the tube. However, it will be appreciated that the tube can be inserted a further distance downwardly into material 28, to enable additional material to flow through entrance opening. 26 into the tube. The limit on the amount of material admitted to tube 12 is the height dimension H of entrance opening 26.

To achieve a rough measurement of the amount of material admitted to tube 12, gradation markings may be provided on the tube outer surface. The user can thus insert the scooping implement downwardly into material 28 to a depth wherein the desired gradation, e.g. four or six ounces, is coincident with the surface of material 28. The captured material within the tube will correspond to the gradation marking coinciding with the surface level of material 28.

As previously noted, material 28 can be any desired flowable material, granular or liquid. In one contemplated usage of the scooping implement, the flowable material is cracked ice located in an ice bucket. The scooping operation involves the transfer of cracked ice from the bucket to a glass containing a soft drink or other beverage. In order to separate the cracked ice from water in the ice bucket, a small hole 34 may be provided in end wall 18. Any water entrained with ice captured by tube 12 can drain out of the tube through the small hole into the ice bucket. There may be other instances where a small drainage hole in end wall 18 could be useful, e.g. where it is desired to extract particulate (granular) material from liquid slurry.

It will be appreciated that the drawings are illustrative of the invention, and that modifications and variants can be employed while still practicing the invention.

What is claimed:

1. A scooping device for extracting flowable material from a mass of material comprising:

a hollow tube having a linear central axis, said tube comprising an annular side wall centered on said axis, a first end (16), and a second end (20);

an end wall (18) closing said first end of the tube, said second end being open to define an unobstructed exit opening;

said end wall being a flat transverse wall extending normal to said central axis;

said annular side wall having a circumferential dimension;

an entrance opening in said annular side wall proximate, to said end wall; said entrance opening having a circumferential dimension that is less than one half the circumferential dimension of said annular side wall;

the cross sectional area of said hollow tube being relatively great at the first end of the tube and relatively small at the second end of the tube, whereby said tube serves as a funnel when flowable material is discharged through said exit opening;

said tube being manipulatable so that the first end of the tube is inserted axially downwardly into a contained mass of flowable material to admit material into the tube through the entrance opening, after which the tube can be inverted to discharge flowable material from the tube through the exit opening.

2. The scooping device of claim 1, wherein the circumferential dimension of said entrance opening is approximately ninety degrees measured around said central axis.

3. The scooping device of claim 1, wherein said hollow tube has a frusto-conical configuration.

4. The scooping device of claim 1, wherein said tube has a sufficient length whereby the tube serves as a handle while the tube is being inserted into a contained mass of flowable material.

* * * * *